C. WEINBERG.
AUTOMOBILE FENDER.
APPLICATION FILED DEC. 31, 1920.

1,427,878.

Patented Sept. 5, 1922

Inventor
C. Weinberg
By his Attorney

Patented Sept. 5, 1922.

1,427,878

UNITED STATES PATENT OFFICE.

CHARLES WEINBERG, OF BROOKLYN, NEW YORK.

AUTOMOBILE FENDER.

Application filed December 31, 1920. Serial No. 434,270.

*To all whom it may concern:*

Be it known that I, CHARLES WEINBERG, a citizen of Russia, and resident of Brooklyn, in the county of Kings and State of New York, have invented certain new and useful Improvements in Automobile Fenders, of which the following is a specification.

This invention relates to automobile buffers, the invention having for its object the provision of efficient means for protecting an automobile from injury by accidental collisions with other vehicles; further objects being to provide a device of this character which is capable of yielding and swinging movement on a horizontal plane and is durable, inexpensive and simple in construction, and which is adaptable for secure attachment to the side bars of an automobile chassis in such manner as to protect both the chassis and the automobile body as well as accessories of the automobile, such as lamps, from injury by impact with parts of vehicles whether they may impinge centrally of the buffer or against the end parts thereof and over or beneath the buffer bar.

In carrying out my invention I employ a non-yielding buffer bar which is extended transversely across and in front of the vehicle, a resilient cushion extended across the face of said bar, elongated vertical loops of resilient metal fixed rearwardly of said bar and having elastic rubber cushions spacing their vertical sides, and brackets fixed to said loops and adapted for connection with the side bars of an automobile chassis, all as hereinafter fully described and specifically set forth in the appended claims.

Figure 1:
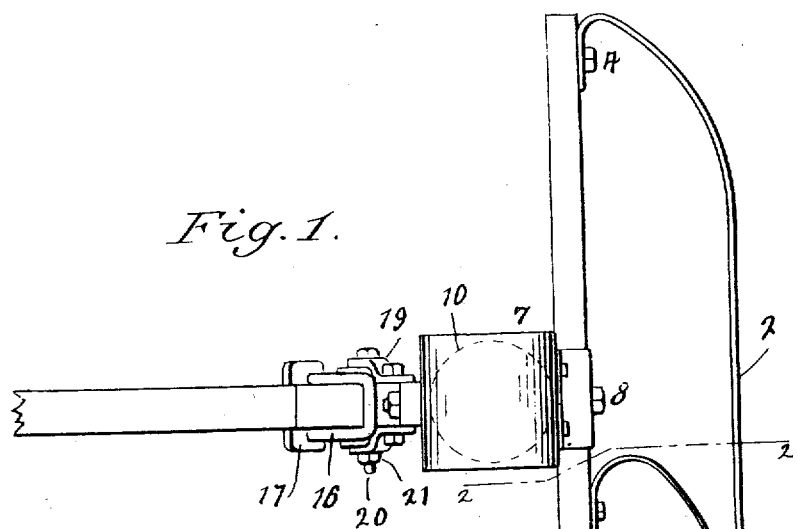
Figure 2:
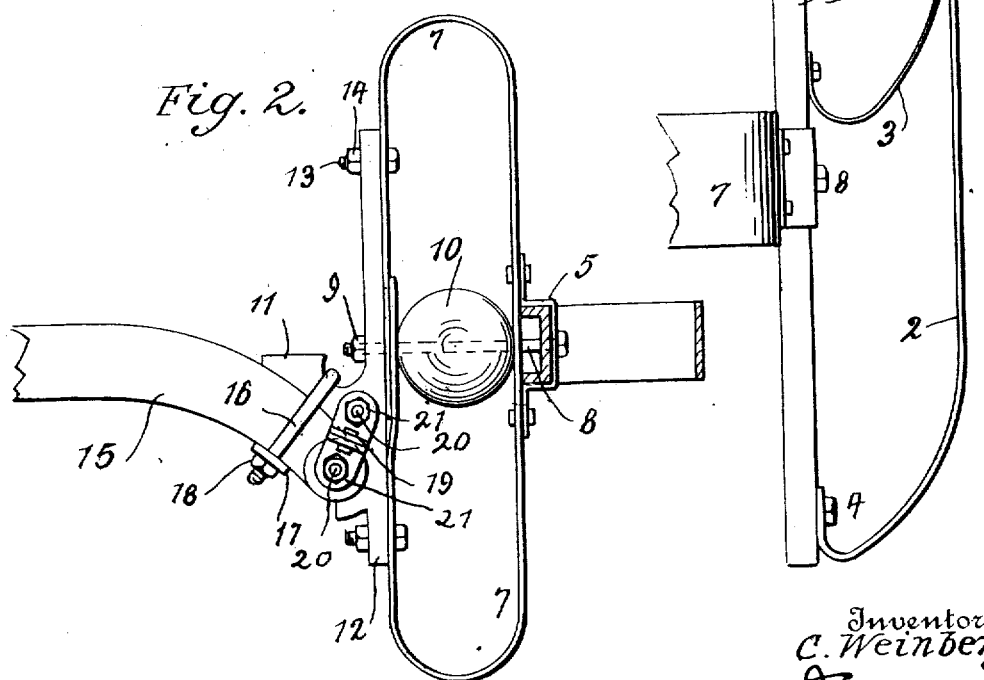

In the accompanying drawings forming part of this specification, Figure 1 is a plan view of an embodiment of my improvements; and Fig. 2 is a cross sectional view taken on the line 2—2 of Fig. 1.

In the drawings, 1 indicates a non-yielding channeled buffer bar adapted for extension in advance of and transversely across either the forward or rearward end of an automobile, and having extended across its face a cushion comprising an elongated resilient bow 2 and a relatively short resilient bow 3, said bows being attached to the bar 1 by means of bolts 4.

Fastened to the bar 1, by means of straps 5 and bolts 6, are elongated endless loops 7, composed of resilient metal and which extend upwardly and downwardly from the bar 1, to form guards for the vehicle to prevent the impact of any objects which might pass over or beneath the buffer bar 1.

Located centrally of each loop 7 and fixed between the upright parts thereof by means of a bolt 8 and a nut 9, is a solid ball 10, of elastic rubber, said bolt 8, extending through said ball and loop and through an upright guard member 12, forming part of a bracket 11, which is also secured to said loop by means of bolts 13 and nuts 14; the bracket being secured to the curved end of a chassis side bar 15, by means of a staple 16 which passes through the plate 17 and is secured by means of nuts 18, straps 19 and bolts and nuts 20 and 21 being also employed for securing the bracket to the chassis side bar.

The resilient loops 7 are slidably adjustable on the transverse buffer bar 1, whereby the buffer may be readily adjusted to automobile frames of various widths.

In the operation of the invention it is manifest that the cushioning and resilient action of the flexible elements located across the face of the non-resilient channel bar 1 absorbs the shock of collision with vehicles or other objects and acts as protective means for said bar, the shock being fully absorbed by means of the resilient loop elements located rearwardly of said bar, whereby the chassis or frame of the automobile to which said loops are attached is subject only to a minimum shock; should an object strike the front cushion at or near the end thereof the tendency will be to swing said end rearwardly whereby said object may be deflected laterally, the shock being absorbed by said resilient elements. In the event of a colliding object passing either over or beneath the channel bar 1 the loops 7 directly sustain the impact, the lower end of the loops protecting the chassis, and the upper ends protecting the automobile body and its accessories, such as its lamps, thus I provide an effective means for obviating liability of direct impact with any part of the automobile in the event of such minor collisions as are constantly occurring during road travel.

I do not wish to confine myself to the specific mechanical details as herein shown and described, as I believe that under the spirit and scope of my invention I am entitled to employ slight variations of mere mechanical detail.

Having thus described my invention what

I claim as new and desire to secure by Letters Patent, is:

1. An automobile buffer, comprising a non-resilient horizontal buffer bar, a resilient cushion extended across the face thereof, vertical resilient loops located rearwardly of said bar, bracket means attached to said loops, and shock absorbing members mounted within said loops.

2. An automobile buffer, comprising a non-resilient horizontal buffer bar, a resilient cushion extended across the face thereof, and vertical loops of resilient metal fixed rearwardly of said bar, and brackets having upright extensions fixed rearwardly of said loops, said brackets having each a curved base part for engaging over the curved end of an automobile chassis side bar.

3. An automobile buffer comprising a non-resilient channeled buffer bar, a resilient cushion comprising spring metal bows extended across the face of said bar, slidably adjustable, vertically extended guard loops of resilient metal located rearwardly on said bar; said loops having respectively cushion means between its upright members, and brackets fixed rearwardly of said loops, said brackets respectively embodying an upright forward part and a rearwardly extended curved base part having a socket for engaging the end of an automobile chassis side bar, and strap and staple means for fixing said brackets to the automobile chassis side bars.

4. In an automobile buffer the combination of a channeled horizontal bar, cushion means extended across the face of said bar, resilient vertical guards in slidable adjustment with the rear thereof, means rearwardly of said vertical guards adapted for attachment to an automobile frame, and a shock absorbing member in each of said vertical guards.

5. An automobile buffer comprising a non-resilient channeled horizontal bar, cushion means extended across the face of said bar, resilient vertically extended guards in slidably adjustable engagement with the rear of said bar yielding members and disposed centrally of, and within said guards, and brackets fixed to said cushioned guards, in combination with the chassis side bars of an automobile, and strap and staple means for fastening said brackets to said side bars.

6. An automobile buffer, comprising an intermediate non-resilient horizontal member, a forward resilient cushion fixed to said intermediate member, and resilient slidably adjustable vertical guards located rearwardly of said intermediate member, movement-resisting members within said guards, and brackets fixed to said guards, whereby the device may be attached to an automobile frame.

7. In an automobile buffer, a non-resilient horizontal buffer bar, resilient means on the face of said bar, and resilient means fixed rearwardly on said bar, said means comprising vertical guards and a resilient ball member disposed within said guards, and brackets attached to said resilient means, said brackets adapted for attachment to an automobile frame.

8. The combination with an automobile frame, of a bumper attached thereto, said bumper comprising a vertical guard member and a resilient ball member mounted within said member.

Signed at New York in the county of New York and State of New York this 23d day of December A. D. 1920.

CHARLES WEINBERG.